(12) United States Patent
Charraud (10) Patent No.: US 11,455,670 B2
(45) Date of Patent: Sep. 27, 2022

(54) COMPUTER-IMPLEMENTED METHOD, SYSTEM, AND NON-TRANSITORY COMPUTER-READABLE MEDIUM FOR A DIGITAL PERSONAL CARE PLATFORM

(71) Applicant: L'Oreal, Paris (FR)

(72) Inventor: Grégoire Charraud, Levallois-Perret (FR)

(73) Assignee: L'Oreal, Paris (FR)

(*) Notice: Subject to any disclaimer, the term of this patent is extended or adjusted under 35 U.S.C. 154(b) by 94 days.

(21) Appl. No.: 16/533,037

(22) Filed: Aug. 6, 2019

(65) Prior Publication Data

US 2021/0042807 A1    Feb. 11, 2021

(51) Int. Cl.
*G06Q 30/06*    (2012.01)
*A45D 2/00*    (2006.01)
(Continued)

(52) U.S. Cl.
CPC .......... *G06Q 30/0621* (2013.01); *A45D 2/00* (2013.01); *A45D 20/00* (2013.01); *A46D 3/00* (2013.01);
(Continued)

(58) Field of Classification Search
CPC . G06Q 30/0601–0645; G06Q 30/0621; G06Q 30/0641; A45D 2/00
(Continued)

(56) References Cited

U.S. PATENT DOCUMENTS 7,437,344 B2    10/2008    Peyrelevade
8,527,365 B2 *    9/2013    Pak .................. G06Q 10/08
705/26.5
(Continued)

FOREIGN PATENT DOCUMENTS

EP    3022149 B1 *    3/2019    .......... G01F 15/005
WO    WO-2013122233 A1 *    8/2013    ............ G16H 40/63
(Continued)

OTHER PUBLICATIONS

Utroske, Deanna. "Beauty box company Cocotique shares data from 2018 Women of Color Hair Care Report". (2018) CosmeticsDesign. com (Year: 2018).*

(Continued)

*Primary Examiner* — Allison G Wood
*Assistant Examiner* — Katherine A Barlow
(74) *Attorney, Agent, or Firm* — Christensen O'Connor Johnson Kindness PLLC (57) ABSTRACT

A computer system receives user-specified settings for a custom formulation of a personal care product, obtains manufacturing parameters for the custom formulation based at least on part on the user-specified settings for the custom formulation; and transmits the manufacturing parameters to a manufacturing computer system. The manufacturing parameters are configured to initiate or guide a manufacturing process to produce the custom formulation of the personal care product. The computer system also receives user-specified settings for a personal care device having at least one computer-controlled component, obtains operational parameters for the personal care device based at least in part on the user-specified settings for the personal care device; and transmits the operational parameters to a remote computing device in communication with the personal care device. The operational parameters are configured to modify at least one operational characteristic of the at least one computer-controlled component of the personal care device.

20 Claims, 6 Drawing Sheets

(51) Int. Cl.
*A45D 20/00* (2006.01)
*A46D 3/00* (2006.01)

(52) U.S. Cl.
CPC ..... *G06Q 30/0613* (2013.01); *G06Q 30/0641* (2013.01)

(58) Field of Classification Search
USPC ................................................ 705/26.1–27.2
See application file for complete search history.

(56) References Cited

U.S. PATENT DOCUMENTS

| | | | | |
|---|---|---|---|---|
| 10,013,875 | B1* | 7/2018 | Miller | H04B 5/0062 |
| 10,140,620 | B2 | 11/2018 | Heath | |
| 2011/0209721 | A1* | 9/2011 | Yahnker | A45D 20/12 |
| | | | | 132/271 |
| 2012/0109777 | A1* | 5/2012 | Lipsitz | G06Q 30/02 |
| | | | | 705/26.5 |
| 2015/0346936 | A1 | 12/2015 | Rodan et al. | |
| 2016/0125490 | A1* | 5/2016 | Angal | G06Q 30/0641 |
| | | | | 705/26.35 |
| 2017/0095070 | A1 | 4/2017 | Machiorlette et al. | |
| 2017/0360693 | A1* | 12/2017 | Yakubov | A61K 8/981 |
| 2018/0285952 | A1* | 10/2018 | Lu | G06Q 30/0621 |
| 2019/0098977 | A1 | 4/2019 | Thiebaut et al. | |
| 2019/0098978 | A1 | 4/2019 | Thiebaut et al. | |

FOREIGN PATENT DOCUMENTS

| | | |
|---|---|---|
| WO | 2017/201549 A1 | 11/2017 |
| WO | 2018/005484 A1 | 1/2018 |

OTHER PUBLICATIONS

Utroske, Deanna. "Croda invests further in Cutitronics". (2019) CosmeticsDesign.com (Year: 2019).*

Taylor, Meggen. "PROVEN: This Female-Led Tech Start-Up Is Using AI To Customize Skincare" (2018) Forbes. com (Year: 2018).*

Tangsripairoj, Songsri et. al. "SkinProf: An Android Application for Smart Cosmetic and Skincare Users" IEEEXplore.com (Year: 2018).*

Clarisonic Mia Smart App—Personalized Skincare Routine—Clarisonic, <https://www.clarisonic.com/skincare-app-mia-smart>, [retrieved May 3, 2019], 6 pages.

Partial Search Report dated Oct. 26, 2020, issued in corresponding International Application No. PCT/EP2020/072170, filed Aug. 6, 2020, 14 pages.

International Search Report and Written Opinion dated Dec. 17, 2020, issued in corresponding International Application No. PCT/EP2020/072170, filed Aug. 6, 2020, 18 pages.

* cited by examiner

FIG. 6

COMPUTER-IMPLEMENTED METHOD, SYSTEM, AND NON-TRANSITORY COMPUTER-READABLE MEDIUM FOR A DIGITAL PERSONAL CARE PLATFORM

SUMMARY

In an embodiment, a server computer system performs a method in which the server computer system receives, from a remote computing device, user-specified settings for a custom formulation of a personal care product, wherein the user-specified settings are based on user input received by the remote computing device via a user interface for customizing formulations of personal care products. The server computer system obtains manufacturing parameters for the custom formulation based at least on part on the user-specified settings, and transmits the manufacturing parameters to a manufacturing computer system, wherein the manufacturing parameters are configured to initiate or guide a manufacturing process to produce the custom formulation of the personal care product. In an embodiment, the user-specified settings comprise a request to include or exclude one or more ingredients in the custom formulation. In an embodiment, the personal care product is a hair care product, and the ingredient to be included or excluded comprises a surfactant, a foaming agent, a pH balancing ingredient, a thickener, an agent to promote smoothness or shine, a conditioner, a moisturizer, a colorant, or a preservative. In an embodiment, the personal care product is a cosmetics product, and the ingredient to be included or excluded comprises a base, a moisturizer, an absorbent, a filler, a colorant, a blemish treatment ingredient, a light-scattering ingredient, a texture ingredient, or a metallic ingredient. In an embodiment, the user-specified settings comprise a request to include an amount or ratio of an ingredient in the custom formulation. In an embodiment, the method further includes authenticating the remote computing device prior to transmitting the manufacturing parameters. In an embodiment, the method further includes comparing the user-specified settings with predefined manufacturing conditions; and transmitting feedback to the remote computing device based on the comparing, wherein the feedback includes suggested revisions to the user-specified settings.

In an embodiment, a server computer system receives, from a first remote computing device, user-specified settings for a personal care device having at least one computer-controlled component, wherein the user-specified settings are based on user input received by the first remote computing device via a user interface for customizing settings of the personal care device. The server computer system obtains operational parameters for the personal care device based at least in part on the user-specified settings, and transmits the operational parameters to a second remote computing device in communication with the personal care device, wherein the operational parameters are configured to modify at least one operational characteristic of the at least one computer-controlled component of the personal care device. In an embodiment, the first remote computing device is not in direct communication with the personal care device. The personal care device may include, for example, a hair dryer, a hair styling iron, or a powered skin brush. In an embodiment, the personal care device comprises a hair dryer, and the at least one computer-controlled component comprises an airflow temperature control, an airflow shape control, or an airflow speed control. In an embodiment, the personal care device comprises a powered skin brush, and the at least one computer-controlled component comprises a brush head speed control, a timer, or a cleansing mode. In an embodiment, the second computing device is a mobile computing device configured to transmit the operational parameters to the personal care device via a short-range wireless communication protocol. In an embodiment, the second remote computing device is integrated in the personal care device. In an embodiment, the method further includes authenticating the first remote computing device prior to transmitting the operational parameters to the second remote computing device.

In an embodiment, a computer system, such as a server computer system, comprises circuitry (e.g., a specially programmed computer system comprising one or more processors and memory) for performing techniques described herein. In an embodiment, the computer system includes circuitry for receiving user-specified settings for a custom formulation of a personal care product, wherein the user-specified settings for the custom formulation are based on user input received via a user interface for customizing formulations of personal care products; circuitry for obtaining manufacturing parameters for the custom formulation based at least on part on the user-specified settings for the custom formulation; circuitry for transmitting the manufacturing parameters to a manufacturing computer system, wherein the manufacturing parameters are configured to guide a manufacturing process to produce the custom formulation of the personal care product; circuitry for receiving user-specified settings for a personal care device having at least one computer-controlled component, wherein the user-specified settings for the personal care device are based on user input received via a user interface for customizing settings of the personal care device; circuitry for obtaining operational parameters for the personal care device based at least in part on the user-specified settings for the personal care device; and circuitry for transmitting the operational parameters to a remote computing device in communication with the personal care device, wherein the operational parameters are configured to modify at least one operational characteristic of the at least one computer-controlled component of the personal care device.

Further embodiments include illustrative computing devices, computer systems, manufacturing systems, and computer-readable media.

Any of the embodiments described herein may be implemented, independently or in any combination, as a feature of a digital personal care marketplace or platform.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

E-commerce platforms and social networking platforms are well known features of today's technological world. Such platforms are useful for selling, shipping, promoting, and sharing information about all types of products and services, including available personal care products and services, as well as providing and sharing information about personal care routines. However, current platforms include many unsolved technical problems.

For example, although personal care products of all types may be purchased on the Internet, the task of finding the right product for a particular consumer is largely left up to the consumer herself, using known tools such as Internet search engines. In a typical scenario, a consumer enters search terms into a search engine such as "makeup" and "sensitive skin," only to be presented with a list of results that may or may not be a good fit for that particular consumer. Existing search tools simply collect and suggest existing search results using known techniques, such as keyword-based searching. Highly knowledgeable searchers, such as hairstylists or cosmetics consultants, may be better able to carefully select keywords to describe a consumer's hair or skin characteristics and desired outcomes. However, these searchers still cannot overcome the fundamental problem that search engines are ill-equipped to inform consumers when there is no existing product that suits their needs. Instead, such tools simply revert to providing "best-available" results that happen to include such keywords, even when such results describe products that are not suitable for the consumer. Furthermore, other technological features of search engines, such as keyword-based advertising, can actively interfere with the consumer's ability to find the right product by promoting search results of certain manufacturers or retailers above other products that may be a better fit for the consumer.

A similar problem arises when consumers search for advice on how to use personal care devices. As such devices become more complex, and include more programmable and Internet-connected features, the act of configuring such devices also becomes more complex, especially for ordinary consumers. A personal care professional may have more knowledge about how such devices should be used and configured for a particular consumer, but it is often inconvenient and sometimes impossible for a consumer to physically hand over her device to a knowledgeable professional for proper configuration. Furthermore, existing platforms do not allow for remote configuration of such devices by personal care professionals.

Embodiments described herein provide technical solutions to one or more of the technical problems described above, or other technical problems.

In an embodiment, a decentralized beauty or personal care supply chain allows experts or beauty/personal care professionals to access and select personal care product customization options from remote locations outside the manufacturer's organization to allow the manufacturer to sell custom products for the consumer under the manufacturer's brand, the beauty/personal care professional's brand, or some other brand. Production quality and safety considerations may be addressed by sharing information between manufacturing systems and product design systems, to ensure that the product characteristics selected by the product designer are available from the manufacturer and meet any applicable requirements, such quality control requirements or consumer product safety requirements. Information may be shared between manufacturing systems, product design systems, and fulfillment systems to ensure high-quality, efficient, and predictable production and delivery times.

In an embodiment, a remote personal care device configuration framework allows remote computing devices, such as devices used by personal care professionals, to allow for remote adjustments of settings of personal care devices to, e.g., improve the effectiveness of the device or enhance the consumer's experience with the device. A wide variety of operational parameters may be adjusted in personal care devices. For example, hair dryer devices may include adjustable temperature and airflow parameters. For such devices, a hair care professional may adjust a setting via website that causes the consumer's hair dryer heat setting to be reduced to avoid damage that was diagnosed during a salon visit. Other adjustable parameters for personal care devices may include adjustable power settings, timers, speed settings (e.g., rotation or oscillation speed for a brush head), haptic feedback parameters, or other parameters or combinations of parameters.

In an embodiment, a digital personal care marketplace platform connects consumers with beauty experts and cosmetics products, enables consumers or personal care professionals to order services and products online, including custom products as described above, and enables remote configuration of personal care devices by knowledgeable professionals, as described above. In addition, recommendations and content may be personalized for the consumer based on contextual information such as consumer preferences, environmental factors, and the like. Consumers can use profiles to store system preferences, social network account or contact information, product/service provider ratings or preferences, location information, questionnaire answers, information from connected devices (e.g., smart care devices such as hair dryers, powered skin brushes, or the like), or other information. In an embodiment, consumer profiles are used for receiving and collecting results of expert analysis (e.g., via a client computing device, in store at a point-of-sale computing device), which may include written feedback, pictures, video, or the like. Profiles may include public data fields, private data fields, or a combination of public and private information. In some situations, experts or personal care professionals may be authorized to provide additional information or suggestions for consumers, or even (with permission) edit consumer's profiles directly (e.g., after a salon appointment or beauty consultation), which can help to enrich a consumer's profile over time to provide high quality recommendations for new products and services.

Information obtained from devices may be used to guide custom product or care routine selections, or for other purposes. Such information may include device identification information, configuration information, usage information (e.g., how often a device is used, duration of use, time of day, etc.), sensor information (e.g., measurements of environmental conditions such as temperature, humidity, pollution levels, UV radiation levels, etc., or skin conditions such as pH levels), combinations of such information, or other information. Sensor information may be provided via sensor-enabled or connected Internet-of-Things (IoT) devices. Such devices may include smart mirrors, sensor-enabled hair-brushes or other personal care devices, weather stations (for environmental sensor information), mobile computing devices, and the like.

Figure 1:
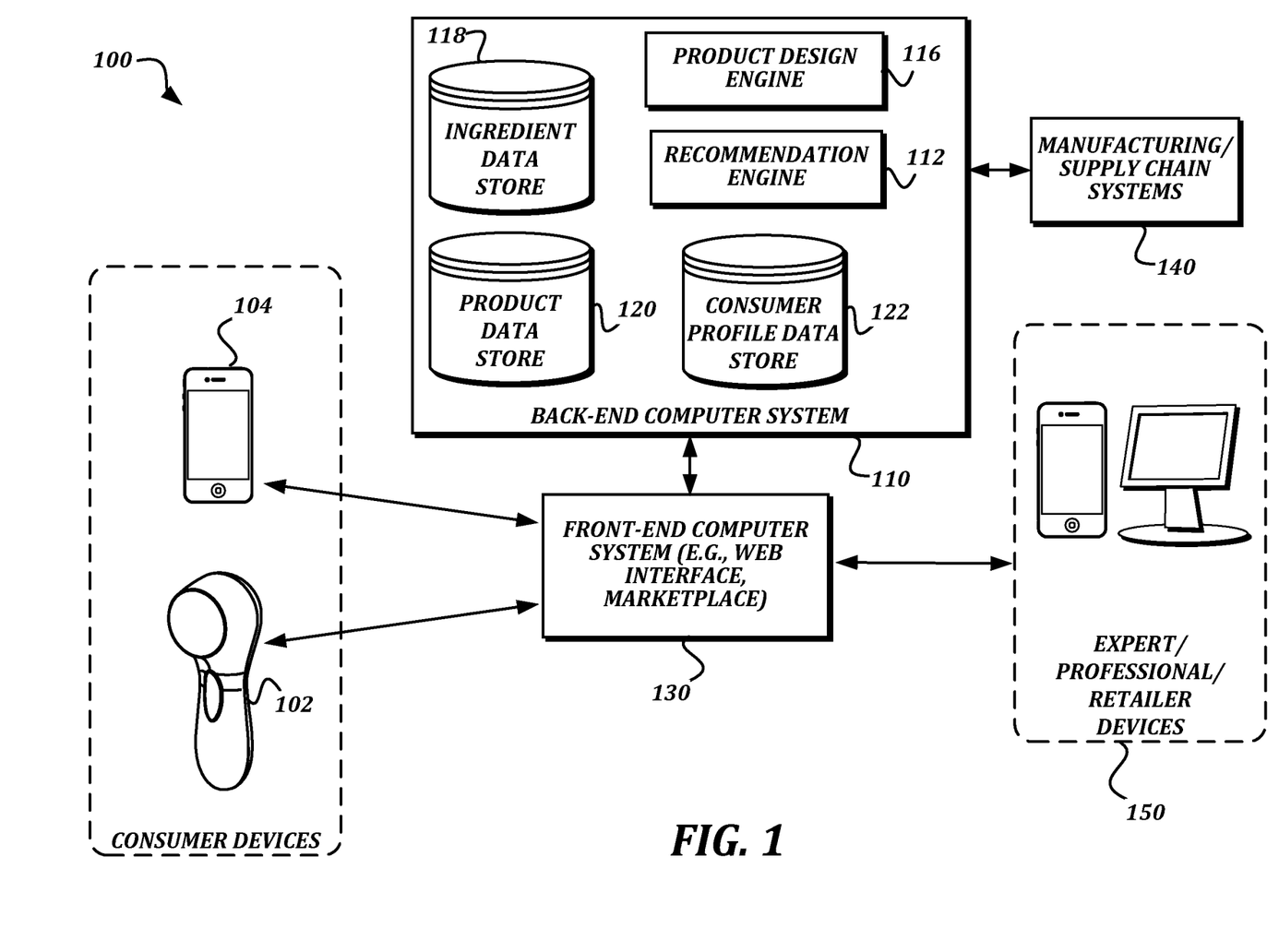
FIG. 1 is a schematic diagram that provides a high-level overview of example functionality of a digital personal care marketplace according to various aspects of the present disclosure.

FIG. 1 is a block diagram that illustrates an example embodiment of a system according to various aspects of the present disclosure that help solve these problems, while also providing technical benefits described in more detail below.

In an embodiment, the system 100 includes functionality for designing and ordering customized personal care products. Non-limiting examples of such products include hair care products, skin care products, and cosmetics. Described embodiments allow end users to select product characteristics, such as one or more ingredients to include or exclude from a product formulation, which the back-end computer system 110 can translate into manufacturing parameters (e.g., ingredients to include, ingredients to exclude, amounts or ratios of included ingredients, and the like) to assist in producing a product according to a consumer's wishes or a personal care profile, thereby enhancing the consumer's experience with the product and overcoming technical limitations of existing e-commerce technology, such as ordinary search engines or sales platforms. In an embodiment, the system 100 includes functionality for remote configuration of personal care devices by end users, such as personal care professionals. Details of such embodiments, and other embodiments, are described in further detail below. Though some aspects are illustrated and described as relating to personal care products and services to succinctly describe one embodiment of the present disclosure, described embodiments need not be limited to such products and services.

As shown, the system 100 includes one or more consumer devices, a back-end computer system 110, a front-end computer system 130, a manufacturing and supply chain system 140, and personal care expert/professional computing devices 150. Each of these components may communicate with each other via a network (not shown), which may include any suitable communication technology including but not limited to wired technologies such as DSL, Ethernet, fiber optic, USB, and Firewire; wireless technologies such as WiFi, WiMAX, 3G, 4G, LTE, 5G, and Bluetooth; and the Internet.

In an illustrative usage scenario, a consumer uses a client computing device 104 to connect to a web interface of the front-end computer system 130 and search for, order, or book appointments for available products or services. The front-end computer system 130 may send consumer information and search information to the back-end computer system, which may use this information to generate custom content for the consumer such as product recommendations. For any products ordered by the consumer at this stage, the front-end computer system 130 may transmit an order to the back-end computer system 110 for further processing. For existing products that do not require customization, the back-end computer system may send a request for fulfillment of the order to the manufacturing and supply chain system 140. For on-demand or custom products, the back-end computer system 110 may send manufacturing parameters (e.g., list of ingredients, amounts of ingredients, ratios of ingredients, packaging designs, etc.) specific to those products. Once the products are prepared and ready for shipment, the manufacturing and supply chain system 140 ships the ordered products. For example, the products may be shipped to a service provider's location (e.g., salon, spa, dermatologist office, makeup consultant, etc.) ahead of an appointment, where the consumer may obtain the product and/or receive the service. The service professional may use one or more computing devices 150 to access the front-end computer system 130 and update the consumer's profile, recommend new products or custom product recipes, or provide new settings or parameters for operation of a connected personal care device 102, such as a hair dryer or a powered skin brush (e.g., for facial cleansing or massaging). In an embodiment, orders for new products or custom products are transmitted from the front-end computer system 130 to the back-end computer system 110 for further processing, whereas device settings may be uploaded to the personal care device 102 or to a client computing device 104 in communication with the personal care device 102.

Illustrative details of components of the system 100, and illustrative ways in which they may be used in combination with one another, will now be described.

Consumer devices in the system 100 may include one or more client computing devices 104 (e.g., a smart phone, tablet computer, etc.). The client computing device 104 may be used by a consumer to interact with other components of the system 100, such as the front-end computer system 130 or personal care devices 102. In an embodiment, the client computing device 104 is a mobile computing device such as a smart phone or a tablet computing device. However, any other suitable type of computing device capable of communicating via the network and presenting a user interface, including but not limited to a desktop computing device, a laptop computing device, a smart speaker, or a smart watch (or combinations of such devices) may be used.

In an embodiment, consumer devices in the system 100 include one or more personal care devices 102. The personal care devices 102 may include environmental sensors and/or computer-controlled mechanical or electrical elements. The personal care devices 102 may include devices such as smart skin care device (e.g., a powered skin brush with computer-controlled elements and data transmission/receiving capability), or a smart hair care device (e.g., a hair brush with humidity or temperature sensors and data transmission capability, a hair dryer with computer-controlled airflow and temperature elements and data transmission/receiving capability). Illustrative features of a personal care device 102 are described below with reference to FIG. 3.

The front-end computer system 130 includes one or more server computers that provide an interface for client computing devices 104 and/or the personal care expert/professional client computing devices 150 to access functionality of the system 100. In an embodiment, the front-end computer system 130 provides a web interface through which an end user may access such functionality, e.g., via a web browser or a dedicated client application.

In an embodiment, the front-end computer system 130 provides access to a digital personal care marketplace. The marketplace is a platform that includes one or more interfaces and one or more databases storing information such as consumer profile information (e.g., skin type, hair type, skin/hair condition information, consumer preferences, etc.)

and/or professional/expert profile information (e.g., location, identity, ratings, available services, prices, etc.). The marketplace may provide functionality for booking appointments and payment and delivery options for products or services. The products or services may be customized (e.g., based on consumer preferences or expert advice) as described in further detail herein. In an illustrative scenario, a consumer orders a service and a product online through a virtual storefront for service provider. The consumer may access the virtual storefront via the front-end computer system 130, which may then submit orders to the back-end computer system 110 for subsequent processing and fulfillment by the manufacturing and supply chain system 140. Fulfillment may include delivery of an ordered product (e.g., to the consumer's address or to the service provider's location ahead of the consumer's scheduled appointment). Fulfillment may also include delivery of product information or guidance to consumer devices or expert/professional computing devices 150.

In an embodiment, the digital personal care marketplace implements an application programming interface (API) that allows service providers, manufacturers, and others to offer services and products through the marketplace. As an example, the marketplace may provide functionality for connecting consumers with experts, retailers, or service providers via audio calls, video calls, instant messaging, email, or the like, to receive advice or request information about products or services. The marketplace may provide a platform for experts, service providers, or retailers to provide content such as videos, articles, or the like to existing customers or prospective customers. The marketplace may include an application store to allow consumers to download software applications to their computing devices that relate to offered products or services.

In an embodiment, the front-end computer system 130 provides access to the back-end computer system 110 for purposes of custom product design, manufacturing, promotions, sales, and the like. In an illustrative scenario, experts, service providers, or retailers register via the front-end computer system 130 to gain access to functionality such as creation of custom product lines, requesting samples, creation of packaging, labels, or promotional materials. Registered users may be authenticated prior to accessing available resources or services. The platform may provide registered entities or users with the ability to utilize the manufacturing and supply chain system 140 to produce such products or materials. In an illustrative scenario, a request from a registered entity for a custom personal care product is analyzed by the back-end product computer system 110 for feasibility, safety, alignment with available manufacturing resources, and the like. If the request for the custom product is approved, the request is translated into particular manufacturing parameters (e.g. by a component of the back-end computer system 110 or the manufacturing and supply chain system 140) which are used by the manufacturing and supply chain system 140 for subsequent production, packaging, shipment to any desired location (such as a salon or the consumer's home), or other actions. This feature allows small businesses and individuals (such as service providers, beauty consultants, or influencers) to leverage the manufacturing and supply chain resources of a larger manufacturer.

The back-end computer system includes one or more server computers. As illustrated, the back-end computer system 110 includes a recommendation engine 112, a product design engine 116, an ingredient data store 118, a product data store 120, and a consumer profile data store 122. In an embodiment, the recommendation engine 112 receives product information from the product data store 120 along with consumer information from the consumer profile data store 122, the client computing device 104, or from some other source, and uses this information to generate content for consumers, experts, service providers, or other audiences. The recommendation engine 112 may, for example, receive a request for information about a product from the client computing device 104, obtain information from the consumer profile data store, and use this information to provide information on the requested product, how to use the requested product, recommendations for other products or product variations (e.g., other shades, finishes, styles, etc.). Such information may be provided to, e.g., the client computing device 104 or some other device. The recommendation engine 112 may employ machine learning or artificial intelligence techniques (e.g., template matching, feature extraction and matching, classification, artificial neural networks, deep learning architectures, genetic algorithms, or the like) to generate product recommendations or other content, or to guide the design of custom products or personal care device configuration settings according to consumer preferences or expert recommendations.

In an embodiment, data regarding the consumer or the consumer's routine is compared with other consumers; results of those comparisons may be provided to the consumer for educational purposes, or stored and analyzed for research purposes (e.g., to improve manufacturer's knowledge of consumer preferences or inter-product compatibility). Customized content provided to the consumer may include recommendations on changes to the consumer's routine, recommended products, or other feedback. The customized content may be further based on additional information such as consumers' answers to questions about themselves, their routine, or the products they use. The customized content or other information may be shared by the consumer via a social network.

A wide variety of information may be used in a custom product design process. As indicated above, such information may be provided by consumers, experts, or other entities directly via a user interface and/or obtained from information stored in customer profiles. Information provided by the consumer may be collected via a browser or a dedicated application executing on a computing device, and customized product information may be received by the same computing device or some other computing device. Similar information and techniques may be used in designing custom care routines or personal care device configuration settings.

In an embodiment, the product design engine 116 may be used to generate customized product recipes based on such information, or human users operating expert/service provider computing devices 150 may be provided with user interfaces at those devices to transmit specific recipes or recommendations. The product design engine 116 may use such information, however it is provided, to generate a custom product recipe. Such information may include product usage history or preferences, personal information such as skin or hair attributes, satisfaction ratings for products and routines, or the like.

In an embodiment, the product design engine 116 generates a recipe or formula for a custom product in response to a request from a consumer or service personal care professional based on information obtained from the product data store 120, the ingredient data store 118, or some other source. For example, the product design engine 116 may review a request including user-specified settings provided as input to a user interface from a client computing device 104 or 150. The product design engine may parse the request for ingredient preferences or recommendations (e.g., ingredients to include or exclude, amounts, ratios, combinations of ingredients to include or exclude, etc.) and select ingredients for the components of the custom product based at least in part on that information.

For example, in a request for custom foundation makeup, ingredients may include moisturizers (e.g., avocado oil, sesame oil, jojoba oil, squalene, glycerides), absorbents and fillers (e.g., silica, alumina, cornstarch, talc), colorants (e.g., pigments, such as iron oxides or titanium dioxide), and ingredients to treat blemishes (e.g., salicylic acid, benzoyl peroxide) or conceal imperfections with light-scattering ingredients (e.g., mica, silicone, quartz), combinations such ingredients, or other ingredients. Other cosmetics products, such as lipstick, may involve other components, such as a wax base (e.g., beeswax, carnauba wax), oils and moisturizers (e.g., olive oil, mineral oil, cocoa butter, lanolin, petrolatum), colorants (e.g., dyes or pigments), fillers, combinations of such ingredients, or other ingredients. Some ingredients may be selected to promote desired characteristics such as effect/shine (e.g., matte, soft, satin, glossy, metallic), finish (e.g., long-lasting, powdery, velvety), coverage (e.g., light, medium, full), color intensity, texture (e.g., gloss, creamy, liquid, wax, powder, lacquer), pearl size (e.g., small, medium, large), pearl density (e.g., high, medium, low), pearl color (e.g., silver, gold, rose), metallic effect (e.g., silver, blue, black, gold), reflection properties, metallic particles, etc. For hair care products such as shampoo, selected ingredients may include surfactants, foaming agents, pH balancing ingredients, thickeners, agents to promote smoothness or shine, conditioners, moisturizers, colorants (e.g., dyes or pigments), combinations of such ingredients, or other ingredients.

Consumers or experts may provide additional preferences for ingredients such as raw material sourcing and traceability, sustainability and environmental standards, or the like. The product design engine 116 may use such information to provide manufacturing parameters (e.g., ingredient types, amounts, or ratios; order of adding ingredients to a mixture; or other special manufacturing instructions) to the manufacturing and supply chain system 140 for production of the custom product.

The product design engine 116 may use internal information to combine with consumer or expert preferences, to ensure a particular level of product performance or quality. For example, a manufacturer may determine that a certain amount or type of surfactants and preservatives are necessary in all shampoo formulations to ensure quality. In this situation, the product design engine 116 may prevent such ingredients from being omitted or changed in custom recipes, while allowing modification, inclusion, or exclusion of ingredients such as thickeners, moisturizers, or conditioners to suit consumer preferences or expert recommendations. Similarly, the product design engine 116 may analyze requested recipes to identify and avoid undesirable interactions between selected ingredients. The product design engine 116 may provide feedback to the requester (e.g., via computing devices 104 or 150) to allow them to change their preferences or requested recipe to improve outcomes, comply with quality guidelines, reduce cost, reduce production time, or the like.

In an illustrative scenario, the manufacturing and supply chain system 140 receives manufacturing parameters from the product design engine 116 and uses this information to formulate custom products. The manufacturing and supply chain system 140 may then prepare a batch of product using a particular mix of ingredients based on the recipe or formula. The components of this mix may be recorded and quantified, and this information may be stored and associated with an identifier for particular batch in the ingredient data store 118. Although the system 140 is illustrated as a combined manufacturing and supply chain system for ease of illustration, it should be understood that manufacturing, labeling, packaging, shipping/fulfillment, or other functionality may be provided in separate systems or subsystems.

In an embodiment, to further improve or enhance the customized product information, additional technical or clinical information relating to the consumer is used. For example, to generate a custom makeup recipe, the product design information may obtain technical analysis of images of the consumer to measure or map wrinkles, pigmentation, etc., of the consumer's skin. In such a scenario, the product design engine 116 may use such information to recommend a particular blend of ingredients for foundation or another makeup product that suits the particular features of the consumer's skin.

In an embodiment, information is stored, transmitted, and shared within the system 100 in a secure and reliable manner. For example, secure connections are established between client computing devices and personal care devices, between client computing devices and server systems, between front-end and back-end systems, between back-end systems and manufacturing or fulfillment systems, or any other set of communicating devices. In an embodiment, in order to ensure that requests and processed in a reliable way, custom product requests are generated in a standard format and populated with information such as author/requester ID, version number, timestamp, manufacturing parameters, amount of product requested, expected use of the product, or the like. Consumers may be securely reminded of care routine events, environment alerts (e.g., temperature, humidity, pollution, or UV radiation warnings) or product expirations; receive recommendations on products, routines, or looks; or receive notifications of new policies, new orders, new shipments, new appointments, upcoming appointments, and the like via push notifications to a client application, email, instant messaging, or some other communication channel.

In general, the communication between the components of FIG. 1 or other computing devices may occur directly or through intermediate devices, and may be implemented using any suitable wired or wireless communication technology. Many alternatives to the arrangement disclosed and described with reference to FIG. 1 are possible. For example, functionality described as being implemented in different components may instead be consolidated into a single component, or functionality described as being implemented in a single component may be implemented in multiple illustrated components, or in other components that are not shown in FIG. 1.

Figure 2:
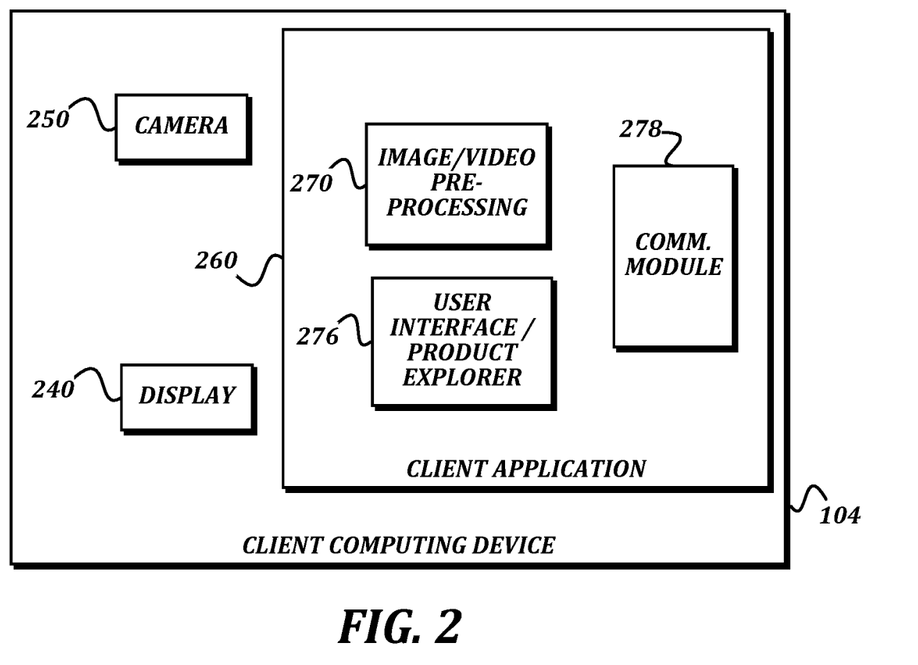
FIG. 2 is a block diagram that illustrates an example embodiment of a client computing device according to various aspects of the present disclosure.

FIG. 2 is a block diagram that illustrates an example embodiment of a client computing device 104 according to various aspects of the present disclosure. FIG. 2 depicts a non-limiting example of client computing device features and configurations; many other features and configurations are possible within the scope of the present disclosure.

In the example shown in FIG. 2, the client computing device 104 includes a camera 250 and a client application 260. The client application 260 includes a user interface 276, which may include interactive functionality such as guides, tutorials, virtual "try-on" functionality, or product exploration technology, which may be presented on a display 240, such as a touchscreen display. In an embodiment, this technology allows consumers to apply different looks or characteristics of a product, e.g., to an image of the consumer's face, hair, skin, etc. This technology also may be used to perform color matching, compare products with other products, test variations in characteristics such as coverage, color, finish, etc. In an embodiment, the user interface 276 provides functionality for exploring custom products recommended by care professionals, such as custom product formulations (e.g., custom formulations of hair treatment products, makeup products, etc.), custom combinations of products to achieve a particular look or effect, variations in products (e.g., color, finish, texture), and the like. The user interface 276 also may provide functionality for designing custom products or modifying customizations suggested by care professionals. Customized content may be obtained by the client computing device 104 (e.g., from the front-end computer system 130) and provided to the consumer via the user interface 276 in the form of product recommendations, tutorial videos, computer animations, simulations, or other user experiences.

Virtual try-on or video recording modes can be used to capture an image or video of the consumer's face, skin, hair, clothing, care products employed in the consumer's care routine, or any other item that may be relevant to providing a custom formulation or recommendation. In an embodiment, the client application 160 uses image/video pre processing functionality 270 to determine, e.g., whether the camera 250 is accurately capturing image information to allow for accurate simulations or recommendations, or whether some adjustments to image capture parameters (e.g., white balance, exposure settings, color temperature, etc.) in the camera settings 252 or adjustments to environmental conditions (e.g., lighting, positioning of the consumer's face within the frame) may be needed.

In an embodiment, a communication module 278 of the client application 260 is used to prepare information for transmission to, or to receive information from other devices or systems, such as the front-end computer system 130 or a personal care device 102. Such information may include custom formulation information, consumer preferences, user identifiers, device identifiers, or the like In an embodiment, product information and image data transmitted to the back-end computer system 110 are used to perform anonymous analytics to, e.g., monitor consumer satisfaction or changes in the end product over time after manufacturing. Product information transmitted to the back-end computer system 110 may include the extracted product information, either alone or in combination with other information such as user preferences or selected variations for a particular product, which may be obtained via the user interface 276. Analytics (e.g., in combination with machine learning processes) can help to improve future procurement and manufacturing processes as well as to provide customers with desirable products in terms of customized tints, textures, or other features.

In an embodiment, the client application 260, user interface 276, or related technology also may be provided via a client computing device 150 at a salon, spa, or retail store. In such an embodiment, the client computing device 150 may include a configuration such as the one shown in FIG. 2. Other features of client computing devices are not shown in FIG. 2 for ease of illustration. A description of illustrative computing devices is provided below with reference to FIG. 6.

Figure 3:
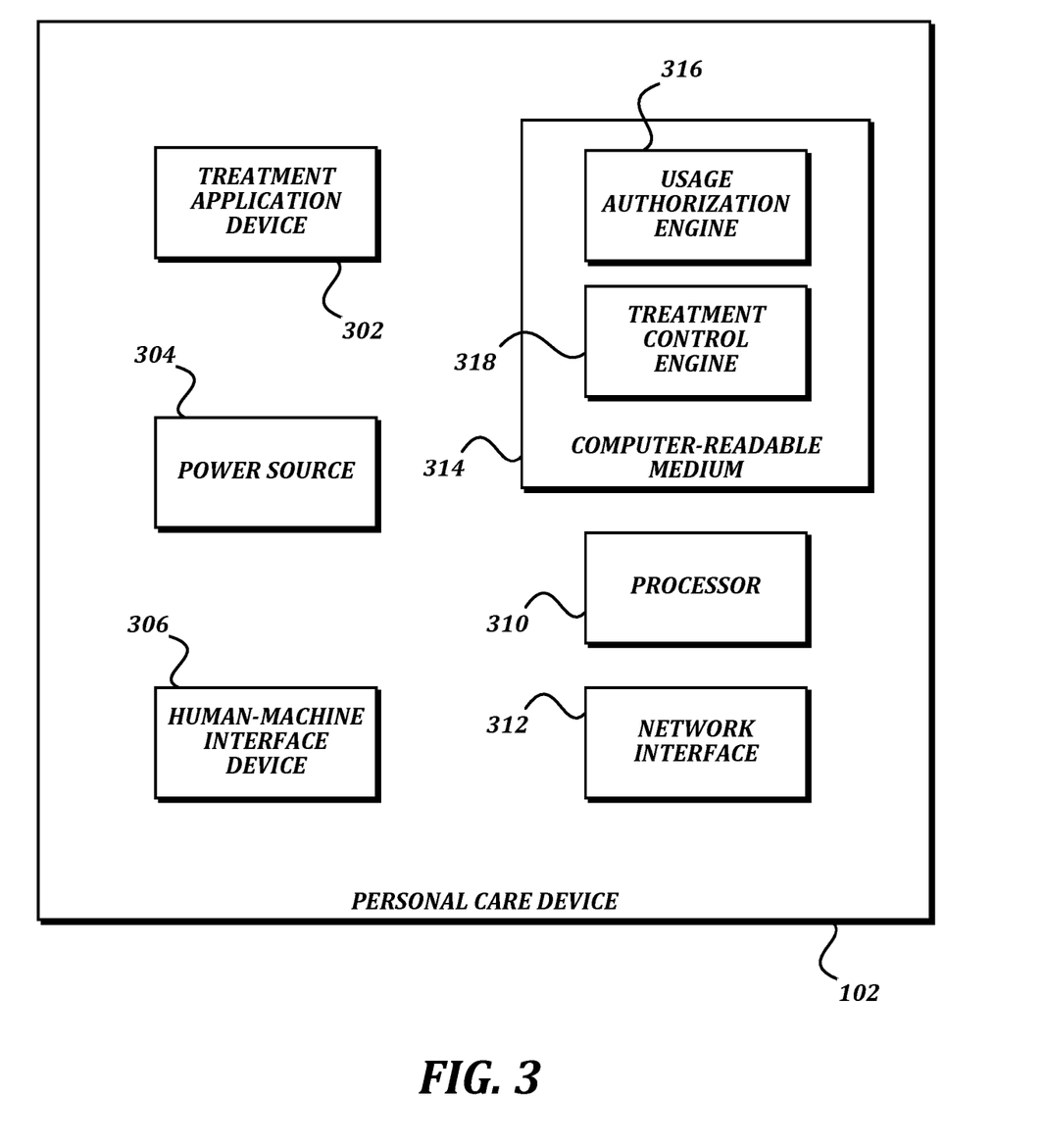
FIG. 3 is a block diagram that illustrates components included in an example embodiment of a personal care device according to various aspects of the present disclosure.

FIG. 3 is a block diagram that illustrates components included in an example embodiment of a personal care device according to various aspects of the present disclosure. FIG. 3 depicts a non-limiting example of personal care device features and configurations; many other features and configurations are possible within the scope of the present disclosure.

In the example shown in FIG. 3, the personal care device 102 includes a treatment application device 302, a power source 304, a human-machine interface device 306, a processor 310, a network interface 312, and a computer-readable medium 314. One non-limiting example of a personal care device 102 is a powered facial cleansing brush with a brush head that oscillates, rotates, or otherwise moves in order to perform a scrubbing action. Other non-limiting examples of personal care devices 102 include a handheld light-emitting device that may be used to expose skin to light to achieve therapeutic benefits, a hair styling iron with adjustable temperature settings, or a hair dryer with adjustable airflow and temperature settings.

In an embodiment, the treatment application device 302 includes one or more devices that collectively apply a treatment to a consumer. For example, if the personal care device 102 is a powered skin brush, the treatment application device 302 may include a drive motor, an armature coupled to the drive motor that accepts a detachable brush head, and the brush head itself. As another example, if the personal care device 102 is a handheld light-emitting device, the treatment application device 302 may include one or more light-emitting diodes (LEDs), lasers, or other light-emitting devices.

In an embodiment, the power source 304 is a rechargeable battery that provides power to the treatment application device 302 for operation. The power source 304 also may also provide power for operation to the other components of the personal care device 102. In other embodiments, instead of a battery, the personal care device 102 may be coupled to an external power source, such as an electrical outlet.

The human-machine interface (HMI) device 306 may be any type of device capable of receiving user input or generating output for presentation to a user. Some non-limiting examples of HMI devices 306 include a push-button switch, a toggle switch, a capacitive switch, a rotary switch, a slide switch, a rocker switch, and a touch screen. In an embodiment, an optional loudspeaker or microphone (not shown) may be included in order to allow the personal care device 102 to present audio content (e.g., synthesized or recorded speech, tones, etc.) and/or receive audio input, such as voice commands from a user.

The processor 310 is configured to execute computer-executable instructions stored on the computer-readable medium 314. In an embodiment, the processor 310 is configured to receive and transmit signals to and/or from the other components of the personal care device 102 via a communication bus or other circuitry. The network interface 312 is configured to transmit and receive signals to and from the client computing device 104 on behalf of the processor 310. The network interface 312 may implement any suitable communication technology, including but not limited to short-range wireless technologies such as Bluetooth, infrared, near-field communication, and Wi-Fi; long-range wireless technologies such as WiMAX, 2G, 3G, 4G, LTE, and 5G; and wired technologies such as USB, FireWire, and Ethernet. The computer-readable medium 314 is any type of computer-readable medium on which computer-executable instructions may be stored, including but not limited to a flash memory, a ROM, an EPROM, an EEPROM, and an FPGA. The computer-readable medium 314 and the processor 310 may be combined into a single device, such as an ASIC, or the computer-readable medium 314 may include a cache memory, a register, or another component of the processor 310.

In the illustrated embodiment, the computer-readable medium 314 has computer-executable instructions stored thereon that, in response to execution by the processor 310, cause the personal care device 102 to provide a usage authorization engine 316 and a treatment control engine 318. In an embodiment, the treatment control engine 318 detects actuation of the HMI device 306, and activates the treatment application device 302 in response. The treatment control engine 318 may then detect a subsequent actuation of the HMI device 306 and deactivate the treatment application device 302 in response, or may allow the treatment application device 302 to operate for a predetermined amount of time before automatically deactivating the treatment application device 302. In an embodiment, the usage authorization engine 316 detects when the HMI device 306 is activated, and determines whether the treatment control engine 318 is authorized to activate the treatment application device 302 before allowing activation.

Within components of the system 100, or by components of the system 100 working in combination, numerous technical benefits are achieved. For example, the ability to automatically generate customized product formulas based on user-specified settings overcomes technical limitations of prior technologies, such as prior search engines and e-commerce platforms, as described above. As another example, the ability to remotely configure personal care devices overcomes technical limitations of prior technologies that depended on consumer's abilities to configure their own devices and did not allow for remote configuration of such devices. As another example, the system 100 allows some aspects of the process to be conducted independently by the client computing devices 104 or 150, such as capturing image data and receiving user input, while moving other processing burdens to the front-end computer system 130 or back-end computer system 110 (which may be a relatively high-powered and reliable computing system) from the client computing devices 104 or 150, thus improving performance and preserving battery life for functionality provided by the client computing devices 104 or 150.

In general, the word "engine," as used herein, refers to logic embodied in hardware or software instructions written in a programming language, such as C, C++, COBOL, JAVA™, PHP, Perl, HTML, CSS, JavaScript, VBScript, ASPX, Microsoft.NET™, and/or the like. An engine may be compiled into executable programs or written in interpreted programming languages. Software engines may be callable from other engines or from themselves. Generally, the engines described herein refer to logical modules that can be merged with other engines or divided into sub-engines. The engines can be stored in any type of computer-readable medium or computer storage device and be stored on and executed by one or more general purpose computers, thus creating a special purpose computer configured to provide the engine or the functionality thereof.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

Figure 4:
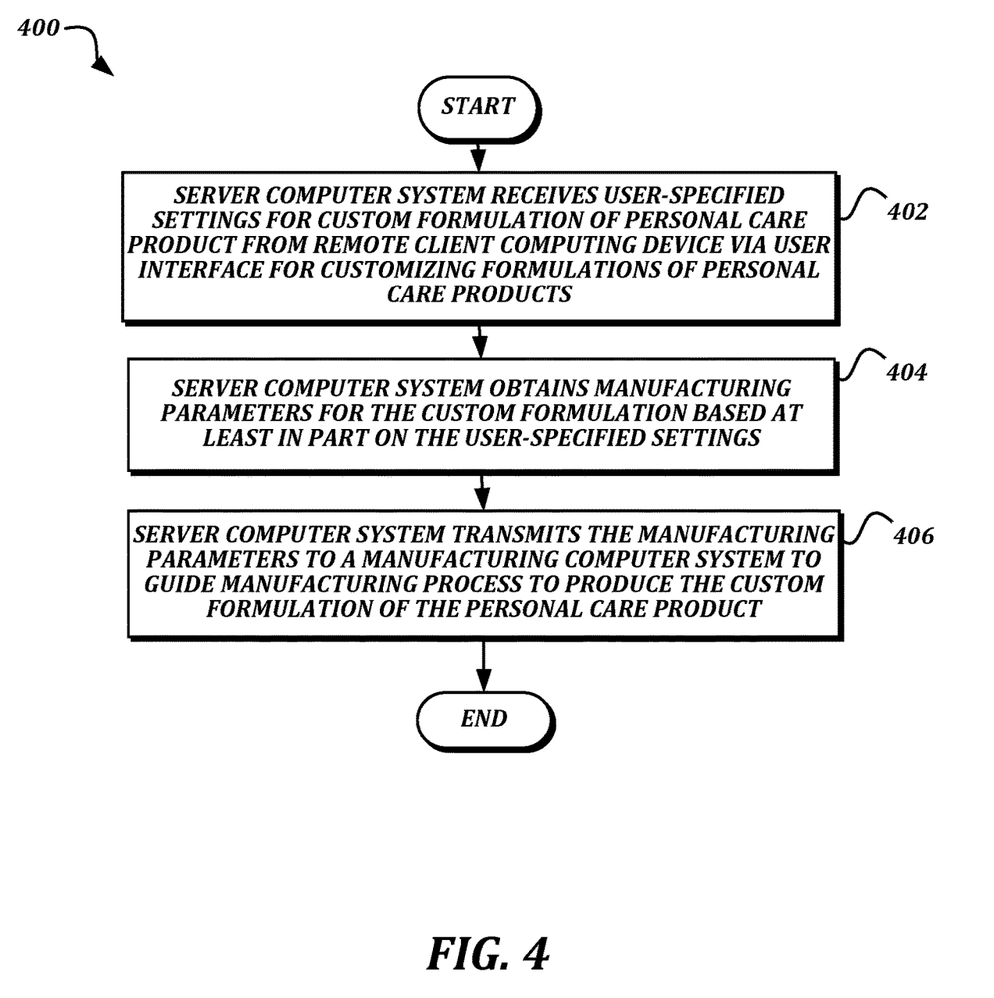
FIG. 4 is a flowchart that illustrates an example embodiment of a method of initiating or guiding a manufacturing process to produce a custom formulation of a personal care product according to various aspects of the present disclosure.

FIG. 4 is a flowchart that illustrates an example embodiment of a method of initiating or guiding a manufacturing process to produce a custom formulation of a personal care product, according to various aspects of the present disclosure. As illustrated, the method 400 is implemented by a server computer system comprising one or more server computers. The method 400 may be implemented by a server computer system including features of the back-end computer system 110 and/or the front-end computer system 130, or by some other computing device or system.

From a start block, the method 400 proceeds to block 402, where a server computer system receives, from a remote computing device, user-specified settings for a custom formulation of a personal care product. The user-specified settings may be included in a product request that also includes information such as the amount of product to be produced, requested delivery date, or the like. The user-specified settings are based on user input received by the remote computing device via a user interface for customizing formulations of personal care products. In an embodiment, the user interface is presented to the remote computing device as a feature of a digital personal care marketplace.

In an embodiment, the user-specified settings comprise a request to include or exclude an ingredient in the custom formulation, or an amount or ratio of ingredients to include in the custom formulation. For example, if the personal care product is a hair care product, the ingredient or combination of ingredients to be included or excluded may include a surfactant, a foaming agent, a pH balancing ingredient, a thickener, an agents to promote smoothness or shine, a conditioner, a moisturizer, a colorant, or a preservative. As another example, if the personal care product is a cosmetics product, the ingredient or combination of ingredients to be included or excluded may include a base, a moisturizer, an absorbent, a filler, a colorant, a blemish treatment ingredient, a light-scattering ingredient, a texture ingredient, or a metallic ingredient.

The method proceeds to block 404, where the server computer system obtains (e.g., from a component of the front-end computer system 130 or the back-end computer system 110) manufacturing parameters for the custom formulation based at least on part on the user-specified settings. The method proceeds to block 406, where the server computer system transmits the manufacturing parameters to a manufacturing computer system, either directly or via an intermediary system. The manufacturing parameters are configured to guide a manufacturing process to produce the custom formulation of the personal care product. As such the server computer system may take steps to authenticate the remote computing device prior to obtaining or transmitting the manufacturing parameters, to ensure that the request is being received from a legitimate source.

The server computer system also may take steps to ensure that the requested formulation complies with predefined conditions before proceeding with the manufacturing process. In an embodiment, the server computer system compares the user-specified settings with predefined manufacturing conditions (e.g., quality guidelines met, health and safety guidelines met, sufficient ingredients available, etc.) prior to transmitting the manufacturing parameters. The server computer system may, if any of the manufacturing conditions are violated, transmit feedback to the remote computing device based on the comparison. The feedback may include suggested revisions to the user-specified settings, which a user of the remote computing device may respond to by making different selections via the user interface.

In an embodiment, the receipt of the manufacturing parameters at the manufacturing computer system initiates the manufacturing process, such that the manufacturing process of the custom formulation is effectively initiated on-demand by the remote computing device based on the user-specified settings. In such cases, the system may confirm that certain conditions have been met (e.g., payment received, quality guidelines met, health and safety guidelines met, sufficient ingredients available at the manufacturing facility to meet a requested delivery date) before manufacturing begins.

Figure 5:
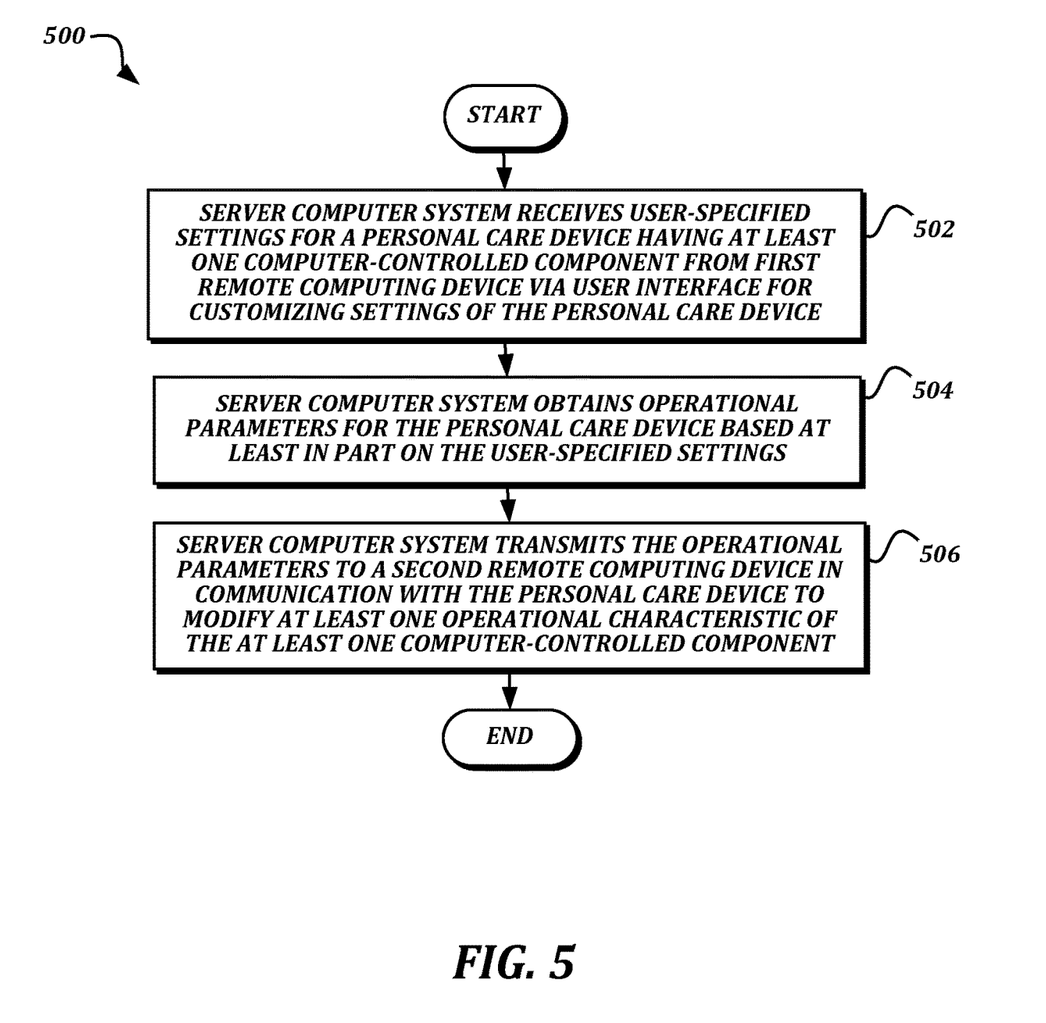
FIG. 5 is a flowchart that illustrates an example embodiment of a method of providing operational parameters to a programmable personal care device according to various aspects of the present disclosure.

FIG. 5 is a flowchart that illustrates an example embodiment of a method of providing operational parameters to a programmable personal care device, according to various aspects of the present disclosure. As illustrated, the method 500 is implemented by a server computer system comprising one or more server computers. The method 500 may be implemented by a server computer system including features of the back-end computer system 110 and/or the front-end computer system 130, or by some other computing device or system.

From a start block, the method 500 proceeds to block 502, where a server computer system receives, from a remote computing device, user-specified settings for a programmable personal care device (e.g., a hair dryer, a hair styling iron, a powered skin brush or massager, etc.) having at least one computer-controlled component. The user-specified settings are based on user input received by the first remote computing device via a user interface for customizing settings of the personal care device. The first remote computing device is not in direct communication with the personal care device. In an embodiment, the user interface is presented to a personal care professional via a user interface of a client computing device 150 at, e.g., a salon, spa, retail store, etc. In this scenario, the client computing device 150 is remote from the server computer system and is also remote from the personal care device, which may be located in the consumer's home. In an embodiment, the user interface is presented to the remote computing device as a feature of a digital personal care marketplace.

The method proceeds to block 404, where the server computer system obtains (e.g., from a component of the front-end computer system 130 or the back-end computer system 110) operational parameters for the personal care device based at least on part on the user-specified settings. The method proceeds to block 406, where the server computer system transmits the operational parameters to a second remote computing device, such as a client computing device 104 in communication with, or configured to communicate with, the personal care device 102. In an embodiment, the second remote computing device is a mobile computing device configured to transmit the operational parameters to the personal care device via a short-range wireless communication protocol (e.g., a Bluetooth or near-field communication (NFC) protocol). Alternatively, the second remote computing device is integrated with the personal care device 102. In such a scenario, the personal care device 102 may not need to be coupled with another computer device to be programmed according to the received operational parameters, which may help to avoid unnecessary complications or delays in the programming process.

The operational parameters are configured to modify at least one operational characteristic of the at least one computer-controlled component of the personal care device. As such the server computer system may take steps to authenticate the first remote computing device prior to obtaining or transmitting the operational parameters, to ensure that the parameters are being received from a legitimate source. This may involve determining whether the consumer has accepted a request by a personal care professional to make such modifications to their device, and/or determining that the personal care professional is registered with the server computer system as a legitimate service provider. Such requests and authentication steps may be processed through the server computer system.

Figure 6:
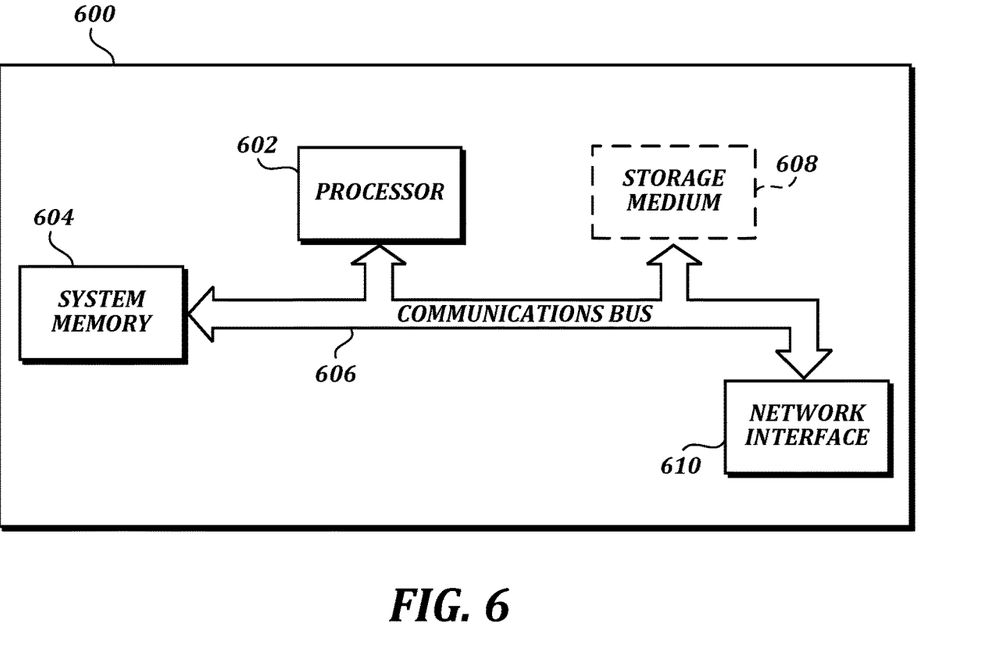
FIG. 6 is a block diagram that illustrates aspects of an exemplary computing device appropriate for use with embodiments of the present disclosure.

FIG. 6 is a block diagram that illustrates aspects of an exemplary computing device 600 appropriate for use with embodiments of the present disclosure. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, LTE, 5G, WiMAX, Bluetooth, and/or the like.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 604 and storage medium 608 depicted in FIG. 6 are merely examples of computer-readable media. In an embodiment, computer-readable media are used to store data for use by programs.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 600 may also include output devices such as a display, speakers, printer, etc. Since these devices are well known in the art, they are not illustrated or described further herein.

Extensions and Alternatives

Many alternatives to the systems and devices described herein are possible. For example, individual modules or subsystems may be separated into additional modules or subsystems or combined into fewer modules or subsystems. As another example, modules or subsystems may be omitted or supplemented with other modules or subsystems. As another example, functions that are indicated as being performed by a particular device, module, or subsystem may instead be performed by one or more other devices, modules, or subsystems. Although some examples in the present disclosure include descriptions of devices comprising specific hardware components in specific arrangements, techniques and tools described herein may be modified to accommodate different hardware components, combinations, or arrangements. Further, although some examples in the present disclosure include descriptions of specific usage scenarios, techniques and tools described herein may be modified to accommodate different usage scenarios. Functionality that is described as being implemented in software may instead be implemented in hardware, or vice versa.

Many alternatives to the techniques described herein are possible. For example, processing stages in the various techniques may be separated into additional stages or combined into fewer stages. As another example, processing stages in the various techniques may be omitted or supplemented with other techniques or processing stages. As another example, processing stages that are described as occurring in a particular order may instead occur in a different order. As another example, processing stages that are described as being performed in a series of steps may instead be handled in a parallel fashion, with multiple modules or software processes concurrently handling one or more of the illustrated processing stages.

User interfaces described herein may be implemented as separate user interfaces or as different states of the same user interface, and the different states can be presented in response to different events, e.g., user input events. The user interfaces may be customized for different devices, input and output capabilities, and the like. For example, the user interfaces may be presented in different ways depending on display size, display orientation, whether the device is a mobile device, etc. Various combinations of graphical user interface elements including text boxes, sliders, drop-down menus, radio buttons, soft buttons, etc., or any other user interface elements, including hardware elements such as buttons, switches, scroll wheels, microphones, cameras, etc., may be used to accept user input in various forms. The user interface elements that are used in a particular implementation or configuration may depend on whether a device has particular input and/or output capabilities (e.g., a touchscreen). Information and user interface elements may be presented in different spatial, logical, and temporal arrangements in various possible implementations. For example, information or user interface elements depicted as being presented simultaneously on a single screen, page, or tab may also be presented at different times, on different screens, pages, or tabs, etc. As another example, some information or user interface elements may be presented conditionally depending on previous input, user preferences, or the like.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer-implemented method, comprising:
presenting, by a server computer system, a digital personal care platform configured to provide a user interface for customizing formulations of personal care products and a user interface for customizing settings of a personal care device having a human-machine interface device, a treatment application device, and at least one computer-controlled component comprising a usage authorization engine and a treatment control engine;
receiving, by the server computer system from a first remote computing device accessing the digital personal care platform, user-specified settings for a custom formulation of a personal care product, wherein the user-specified settings for the custom formulation are based on user input received by the first remote computing device via a user interface provided by the digital personal care platform at the first remote computing device for customizing formulations of personal care products;
obtaining, by the server computer system, manufacturing parameters for the custom formulation based at least on part on the user-specified settings for the custom formulation;
transmitting, by the server computer system, the manufacturing parameters to a manufacturing computer system, wherein the manufacturing parameters are configured to initiate or guide a manufacturing process to produce the custom formulation of the personal care product;
receiving, by the server computer system from the first remote computing device accessing the digital personal care platform, user-specified settings for the personal care device having at least one computer-controlled component, wherein the user-specified settings for the personal care device are based on user input received via a user interface provided by the digital personal care platform at the first remote computing device for customizing settings of the treatment control engine of the personal care device, and wherein the first remote computing device is not in direct communication with the personal care device;

obtaining, by the server computer system, operational parameters for the personal care device based at least in part on the user-specified settings for the personal care device;

transmitting the operational parameters from the server computer system to a second remote computing device in communication with the personal care device, wherein the operational parameters are configured to modify at least one operational characteristic of the treatment control engine of the at least one computer-controlled component of the personal care device; and obtaining, by the server computer system, measurements of humidity, wherein the manufacturing parameters for the custom formulation and the operational parameters for the personal care device are based at least in part on the measurements of humidity, wherein the treatment control engine is configured to detect actuation of the human-machine interface device and activate the treatment application device in accordance with the at least one modified operational characteristic, and wherein the usage authorization engine is configured to determine whether the treatment control engine is authorized to activate the treatment application device before allowing activation of the treatment application device in accordance with the at least one modified operational characteristic.

2. The method of claim 1, wherein the user-specified settings for the custom formulation comprise a request to include or exclude an ingredient in the custom formulation.

3. The method of claim 2, wherein the personal care product is a hair care product, and wherein the ingredient comprises a surfactant, a foaming agent, a pH balancing ingredient, a thickener, an agent to promote smoothness or shine, a conditioner, a moisturizer, a colorant, or a preservative.

4. The method of claim 2, wherein the personal care product is a cosmetics product, and wherein the ingredient comprises a base, a moisturizer, an absorbent, a filler, a colorant, a blemish treatment ingredient, a light-scattering ingredient, a texture ingredient, or a metallic ingredient.

5. The method of claim 1, wherein the user-specified settings for the custom formulation comprise a request to include an amount or ratio of an ingredient in the custom formulation.

6. The method of claim 1 further comprising authenticating the first remote computing device prior to transmitting the manufacturing parameters.

7. The method of claim 1 further comprising:
comparing the user-specified settings for the custom formulation with predefined manufacturing conditions; and
transmitting feedback to the first remote computing device based on the comparing, wherein the feedback includes suggested revisions to the user-specified settings.

8. A digital personal care platform computer system comprising:
circuitry for presenting a digital personal care platform configured to provide a user interface for customizing formulations of personal care products and a user interface for customizing settings of a personal care device having a human-machine interface device, a treatment application device, and at least one computer-controlled component comprising a usage authorization engine and a treatment control engine;

circuitry for receiving, from a first remote computing device accessing the digital personal care platform, user-specified settings for a custom formulation of a personal care product, wherein the user-specified settings for the custom formulation are based on user input received via a user interface provided by the digital personal care platform at the first remote computing device for customizing formulations of personal care products;

circuitry for obtaining manufacturing parameters for the custom formulation based at least on part on the user-specified settings for the custom formulation;

circuitry for transmitting the manufacturing parameters from the digital personal care platform computer system to a manufacturing computer system, wherein the manufacturing parameters are configured to initiate or guide a manufacturing process to produce the custom formulation of the personal care product;

circuitry for receiving, from the first remote computing device accessing the digital personal care platform, user-specified settings for the personal care device having at least one computer-controlled component, wherein the user-specified settings for the personal care device are based on user input received via a user interface provided by the digital personal care platform at the first remote computing device for customizing settings of the treatment control engine of the personal care device, and wherein the first remote computing device is not in direct communication with the personal care device;

circuitry for obtaining operational parameters for the personal care device based at least in part on the user-specified settings for the personal care device;

circuitry for transmitting the operational parameters from the digital personal care platform computer system to a second remote computing device in communication with the personal care device, wherein the operational parameters are configured to modify at least one operational characteristic of the treatment control engine of the at least one computer-controlled component of the personal care device; and circuitry for obtaining measurements of humidity, wherein the manufacturing parameters for the custom formulation and the operational parameters for the personal care device are based at least in part on the measurements of humidity, wherein the treatment control engine is configured to detect actuation of the human-machine interface device and activate the treatment application device in accordance with the at least one modified operational characteristic, and wherein the usage authorization engine is configured to determine whether the treatment control engine is authorized to activate the treatment application device before allowing activation of the treatment application device in accordance with the at least one modified operational characteristic.

9. The computer system of claim 8, wherein the user-specified settings for the custom formulation comprise a request to include or exclude an ingredient in the custom formulation.

10. The computer system of claim 8, wherein the user-specified settings for the custom formulation comprise a request to include an amount or ratio of an ingredient in the custom formulation.

11. The computer system of claim 8, wherein the second remote computing device is a mobile computing device configured to transmit the operational parameters to the personal care device via a short-range wireless communication protocol.

12. A non-transitory computer-readable medium having stored thereon computer-executable instructions configured to cause a server computer system to perform steps comprising:

presenting a digital personal care platform configured to provide a user interface for customizing formulations of personal care products and a user interface for customizing settings of a personal care device having a human-machine interface device, a treatment application device, and at least one computer-controlled component comprising a usage authorization engine and a treatment control engine;

receiving, from a first remote computing device accessing the digital personal care platform, user-specified settings for a custom formulation of a personal care product, wherein the user-specified settings for the custom formulation are based on user input received by the first remote computing device via a user interface provided by the digital personal care platform at the first remote computing device for customizing formulations of personal care products;

obtaining manufacturing parameters for the custom formulation based at least on part on the user-specified settings for the custom formulation; transmitting the manufacturing parameters to a manufacturing computer system, wherein the manufacturing parameters are configured to initiate or guide a manufacturing process to produce the custom formulation of the personal care product;

receiving, from the first remote computing device accessing the digital personal care platform, user-specified settings for the personal care device having at least one computer-controlled component, wherein the user-specified settings for the personal care device are based on user input received via a user interface provided by the digital personal care platform at the first remote computing device for customizing settings of the treatment control engine of the personal care device, and wherein the first remote computing device is not in direct communication with the personal care device;

obtaining operational parameters for the personal care device based at least in part on the user-specified settings for the personal care device; transmitting the operational parameters to a second remote computing device in communication with the personal care device, wherein the operational parameters are configured to modify at least one operational characteristic of the treatment control engine of the at least one computer-controlled component of the personal care device; and obtaining measurements of humidity, wherein the manufacturing parameters for the custom formulation and the operational parameters for the personal care device are based at least in part on the measurements of humidity, wherein the treatment control engine is configured to detect actuation of the human-machine interface device and activate the treatment application device in accordance with the at least one modified operational characteristic, and wherein the usage authorization engine is configured to determine whether the treatment control engine is authorized to activate the treatment application device before allowing activation of the treatment application device in accordance with the at least one modified operational characteristic.

13. The non-transitory computer-readable medium of claim 12, wherein the personal care product is a hair care product, and wherein the user-specified settings for the custom formulation comprise a request to include or exclude a surfactant, a foaming agent, a pH balancing ingredient, a thickener, an agent to promote smoothness or shine, a conditioner, a moisturizer, a colorant, or a preservative in the custom formulation.

14. The non-transitory computer-readable medium of claim 12, wherein the personal care product is a cosmetics product, and wherein the user-specified settings for the custom formulation comprise a request to include or exclude a base, a moisturizer, an absorbent, a filler, a colorant, a blemish treatment ingredient, a light-scattering ingredient, a texture ingredient, or a metallic ingredient in the custom formulation.

15. The non-transitory computer-readable medium of claim 12, the steps further comprising authenticating the first remote computing device.

16. The non-transitory computer-readable medium of claim 12, the steps further comprising comparing the user-specified settings for the custom formulation with predefined manufacturing conditions and transmitting feedback to the first remote computing device based on the comparing, wherein the feedback includes suggested revisions to the user-specified settings for the custom formulation.

17. The non-transitory computer-readable medium of claim 12, wherein the personal care device comprises a hair dryer, a hair styling iron, or a powered skin brush.

18. The non-transitory computer-readable medium of claim 12, wherein the personal care device comprises a hair dryer, and wherein the at least one computer-controlled component comprises an airflow temperature control, an airflow shape control, or an airflow speed control.

19. The non-transitory computer-readable medium of claim 12, wherein the personal care device comprises a powered skin brush, and wherein the at least one computer-controlled component comprises a brush head speed control, a timer, or a cleansing mode.

20. The non-transitory computer-readable medium of claim 12, wherein the second remote computing device is integrated in the personal care device.

* * * * *